(12) United States Patent
Baumgartner et al.

(10) Patent No.: US 7,899,590 B2
(45) Date of Patent: Mar. 1, 2011

(54) METHOD AND DEVICE FOR ASSOCIATING AN ELECTRONIC WHEEL UNIT, WHICH IS ASSIGNED TO A WHEEL, WITH A SIDE OF A VEHICLE

(75) Inventors: Walter Baumgartner, Tournefeuille (FR); Frank Fischer, Regensburg (DE)

(73) Assignee: Siemens VDO Automotive AG, Munich (DE)

( * ) Notice: Subject to any disclaimer, the term of this patent is extended or adjusted under 35 U.S.C. 154(b) by 823 days.

(21) Appl. No.: 11/834,977

(22) Filed: Aug. 7, 2007

(65) Prior Publication Data

US 2008/0033608 A1 Feb. 7, 2008

(30) Foreign Application Priority Data

Aug. 7, 2006 (DE) .................. 10 2006 036 819

(51) Int. Cl.
*G01M 17/013* (2006.01)

(52) U.S. Cl. .............................. 701/29; 701/31; 701/33

(58) Field of Classification Search ............ 701/29–36, 701/70–75; 340/426.33, 442, 444, 443, 445, 340/447; 73/146, 146.2, 146.5, 146.4
See application file for complete search history.

(56) References Cited

U.S. PATENT DOCUMENTS

| 6,446,502 B1 | 9/2002 | Normann et al. |
| 6,633,229 B1 | 10/2003 | Normann et al. |
| 6,801,872 B2 | 10/2004 | Normann et al. |
| 6,980,099 B2 | 12/2005 | Kroitzsch et al. |
| 7,414,571 B2 * | 8/2008 | Schantz et al. .............. 342/125 |
| 7,518,497 B2 * | 4/2009 | Jost ............................ 340/445 |

FOREIGN PATENT DOCUMENTS

| DE | 197 35 686 A1 | 2/1999 |
| DE | 198 56 861 B4 | 6/2000 |
| DE | 100 12 458 C2 | 9/2001 |
| DE | 102 29 465 A1 | 1/2004 |
| DE | 10 2004 053 485 B3 | 6/2006 |

* cited by examiner

*Primary Examiner*—Richard M. Camby
(74) *Attorney, Agent, or Firm*—Laurence A. Greenberg; Werner H. Stemer; Ralph E. Locher

(57) ABSTRACT

The present invention relates to a method and a device for assigning an electronic wheel unit, which is assigned to a wheel of a vehicle and is for ascertaining at least one characteristic parameter of the wheel, to a side of the vehicle. In this case, a direction of rotation of the wheel is determined by means of the wheel unit. The direction of rotation of the wheel which is determined by means of the wheel unit is compared with a direction of rotation of another wheel which is determined by means of another wheel unit assigned to the other wheel, wherein the wheel and the other wheel are arranged on different sides of the vehicle on a shared axle. Depending on the comparison of the determined directions of rotation of the wheel and of the other wheel, the wheel unit is assigned on the basis of a first procedure for assigning the wheel unit to the side of the vehicle or on the basis of a second procedure for assigning the wheel unit to the side of the vehicle. In this case, the direction of rotation determined by the wheel unit is utilized in the first procedure, and the second procedure is independent of the direction of rotation determined by the wheel unit.

12 Claims, 2 Drawing Sheets

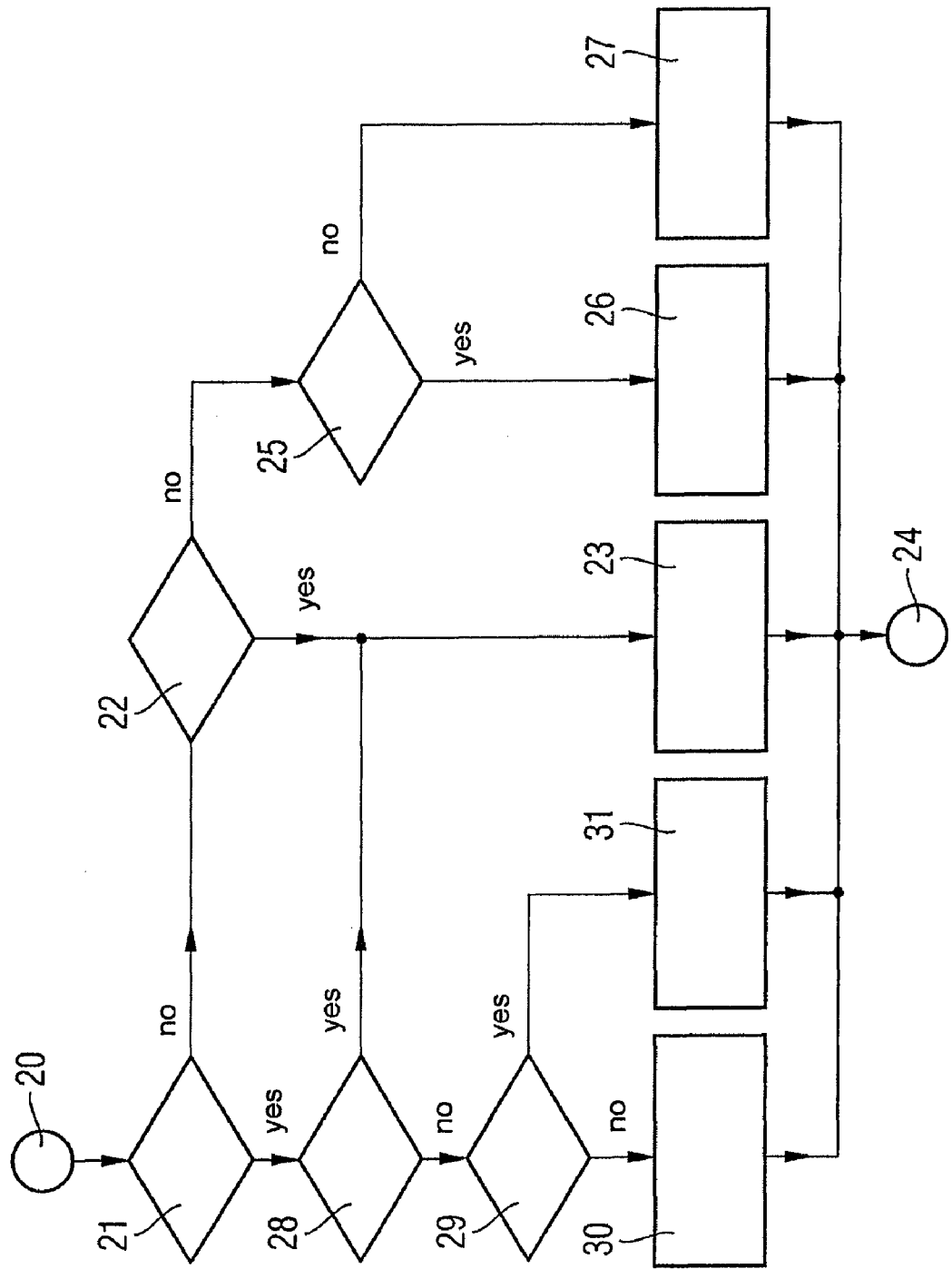

METHOD AND DEVICE FOR ASSOCIATING AN ELECTRONIC WHEEL UNIT, WHICH IS ASSIGNED TO A WHEEL, WITH A SIDE OF A VEHICLE

CROSS-REFERENCE TO RELATED APPLICATION

This application claims the priority, under 35 U.S.C. §119, of German application DE 10 2006 036 819.3, filed Aug. 7, 2006; the prior application is herewith incorporated by reference in its entirety.

BACKGROUND OF THE INVENTION

1. Field of the Invention

The present invention relates to a method and a device for associating or assigning an electronic wheel unit, which is assigned to a wheel of a vehicle and is for ascertaining at least one characteristic parameter of the assigned wheel, with a side of the vehicle.

Such a method and such a device are known in the context of monitoring tire pressures of wheels of the vehicle. The air pressure of such a wheel is subject to changes during the vehicle operation, and the changes can be detrimental to the driving characteristics of the vehicle. Modern vehicles, in particular motor vehicles, therefore include facilities for checking the tire pressures automatically. If the current tire pressures exhibit critical values, this can be indicated to the driver of the vehicle.

For the purpose of establishing the tire pressures, the wheels of the vehicle are assigned electronic wheel units including inter alia sensors by means of which the air pressures can be determined. The data relating to the determined air pressures and further data which is ascertained by the wheel units are transferred, in particular by means of a wireless communication entity, to a central control unit of the vehicle for the purpose of further analysis. In order to enable the control unit to assign the data transferred from the wheel units to correct wheel positions of the wheels on the vehicle, it must know how the wheel units are assigned to the wheels. This is problematic in that the assignment of wheel units and wheels can change as a result of swapping wheels over or installing a spare wheel.

In order to assign such a wheel unit to a side of the vehicle, i.e. in particular to a left-hand or right-hand longitudinal side of the vehicle, the direction of rotation of a wheel can be determined by means of a sensor. In conjunction with an assignment of the wheel unit to an axle of the vehicle, it is possible to carry out an assignment of the wheel unit to a specific wheel position on the vehicle. The assignment of the wheel unit to the axle can be done e.g. by analyzing a signal intensity of a signal which is utilized for wirelessly transferring the data from the wheel unit to the central control unit. The wheel units are usually mounted in the same orientation on a wheel. Because two wheels, and hence the wheel units which are assigned to the wheels, are attached in a mirrored manner at opposing ends of a shared axle, and hence on two sides of the vehicle, the sensors report different directions of rotation when the vehicle is moving. The sensor on the left-hand side of the vehicle normally detects a forward rotation, and that on the right-hand side a backward rotation. If these detections of the directions of rotation are combined with data relating to the actual travel direction of the vehicle, i.e. whether the vehicle is traveling forwards or backwards, it is possible to perform an assignment of a wheel unit to the side of the vehicle.

If the wheel units are implemented as independent components, it can be ensured that they are mounted in the same orientation on wheels. However, if it is attempted to integrate the electronic wheel units in tires of wheels, these featuring e.g. a combination of tires and rims, it is not possible to ensure an identical orientation of the wheel units which are integrated in the tires. It cannot necessarily be guaranteed that the normally symmetrical tires, and hence the wheel units, are mounted in the same orientation on the rims.

SUMMARY OF THE INVENTION

It is accordingly an object of the invention to provide a method and a device for associating a wheel with a side of a motor vehicle which overcomes the above-mentioned disadvantages of the heretofore-known devices and methods of this general type and which provides for a reliable assignment of a wheel unit to a side of a vehicle.

With the foregoing and other objects in view there is provided, in accordance with the invention, a method of associating an electronic wheel unit with a side of a motor vehicle; the electronic wheel unit is assigned to a wheel of the motor vehicle and it is configured to ascertain at least one characteristic parameter of the wheel. The method comprises:

determining a direction of rotation of a given wheel with a the respectively associated given wheel unit;

comparing the direction of rotation of the given wheel determined by the given wheel unit with a direction of rotation of another wheel determined with a respectively associated wheel unit to form a comparison result, wherein the given wheel and the other wheel are mounted on mutually different sides of the motor vehicle on a shared axle; and depending on the comparison result, associating the given wheel unit on a basis of a first procedure for associating the wheel unit with the side of the vehicle or on a basis of a second procedure for associating the wheel unit with the side of the vehicle, wherein the first procedure for associating the wheel unit utilizes the direction of rotation determined by the wheel unit, and the second procedure is independent of the direction of rotation determined by the wheel unit.

With the above and other objects in view there is also provided, in accordance with the invention, a device for associating an electronic wheel unit with a side of a motor vehicle, wherein the electronic wheel unit is assigned to a wheel of the motor vehicle and is configured to ascertain at least one characteristic parameter of the wheel. The device comprises a control unit that is configured to:

control a determination, by way of a given wheel unit, of a direction of rotation of a given wheel;

compare the direction of rotation of the given wheel determined by way of the given wheel unit with a direction of rotation of another wheel determined by way of another wheel unit assigned to the other wheel, wherein the given wheel and the other wheel are mounted on mutually different sides of the vehicle on a shared axle; and depending on the comparison of the direction of rotation of the given wheel with the direction of rotation of the other wheel, assign the wheel unit on the basis of a first procedure for assigning the wheel unit to a side of the vehicle or on the basis of a second procedure for assigning the wheel unit to a side of the vehicle; and wherein the control unit utilizes the direction of rotation determined by the wheel unit in the first procedure, and the control unit performs the second procedure independent of the direction of rotation determined by way of the wheel unit.

According to the invention, an association of an electronic wheel unit, which is assigned to a wheel of a vehicle and ascertains at least one characteristic parameter of the wheel, with a side of the vehicle is effected by determining a direction of rotation of the wheel by means of the wheel unit. The direction of rotation of the wheel which is determined by means of the wheel unit is compared with a direction of rotation of another wheel which is determined by means of another wheel unit assigned to the other wheel. In this case, the wheel and the other wheel are arranged on different sides of the vehicle on a shared axle. Depending on the comparison of the determined directions of rotation of the wheel and of the other wheel, the wheel unit is assigned on the basis of a first procedure for assigning the wheel unit to the side of the vehicle or on the basis of a second procedure for assigning the wheel unit to the side of the vehicle. In this case, the direction of rotation determined by the wheel unit is utilized in the first procedure, and the second procedure is independent of the direction of rotation determined by the wheel unit.

On the basis of the present invention, two mutually independent procedures for assigning the wheel unit to the side of the vehicle can be implemented, each having its own specific advantages. Depending on the comparison of the two directions of rotation, the advantages can be utilized as appropriate. For example, the first procedure can be available particularly quickly, while the second procedure is particularly reliable for the correct assignment. Even after a tire change, for example, it can be ensured that the assignment of a wheel unit to a side of the vehicle takes place quickly, efficiently and reliably. The driver of the vehicle can therefore rely on the assignment that has been performed. This reinforces the confidence of the driver in the technology and increases the safety of the driver when driving in the vehicle. The invention is economical to implement, since it does not require any additional components. The direction of rotation is ascertained by the wheel unit as a characteristic parameter. The direction of rotation can be ascertained in a manner which is particularly simple, quick and reliable. In particular, the wheel unit is allocated to the axle of the vehicle before the assignment to the side of the vehicle. As a result, a wheel position to which the wheel unit is assigned can then be identified particularly quickly and reliably. When comparing the two directions of rotation determined by the wheel unit and the other wheel unit, a check establishes whether the directions of rotation are the same or different. This sameness or difference of the directions of rotation can be established particularly quickly and can advantageously be used for rapidly deciding whether the assignment of the wheel units should take place on the basis of the first or the second procedure.

According to a preferred development of the invention, the second procedure is not carried out if the wheel unit is assigned to the side of the vehicle on the basis of the first procedure. It is therefore unnecessary to spend time which is required to perform the second procedure. Consequently, the driver can receive a result of the assignment particularly quickly.

If the directions of rotation which are determined by means of the wheel unit and the other wheel unit are the same, the wheel unit is particularly advantageously assigned to the side of the vehicle on the basis of the second procedure. If the determined directions of rotation are the same, a first problem scenario is present and can easily be detected by the vehicle, in particular by a central control unit of the vehicle, since the two directions of rotation of the wheel units are not opposite to each other. This should be the case in the case of a normal, correct layout and configuration, however. It can therefore be deduced that the wheel units which are present on opposite sides of the shared axle are mounted in different orientations. It is not possible reliably to assign the two wheel units to one of the sides of the vehicle exclusively by means of the determined directions of rotation and possibly travel information relating to forward or backward travel of the vehicle. In order to guarantee a reliable assignment, the second procedure is therefore carried out and the assignment is performed on the basis of the results of the second procedure.

According to a preferred development, if the directions of rotation which are determined by means of the wheel unit and the other wheel unit are different, both the first procedure and the second procedure are carried out. Provision is made for checking whether the results of the two procedures correspond. If the determined directions of rotation are different, it then remains uncertain whether the assignment of the wheel unit to the side of the vehicle can actually be correctly performed by means of the first procedure. Specifically, it is conceivable that the orientations of the wheel unit and the other wheel unit are the same, but in fact different than would normally be the case. The assignment of the wheel unit exclusively on the basis of the determined directions of rotation could therefore have precisely the opposite outcome to that which it actually should. A second problem scenario is then present which cannot be definitively detected solely on the basis of the first procedure by the vehicle, in particular by its central control unit. In order to guarantee the reliable assignment, the second procedure is therefore carried out. It is then advantageously possible to check whether the second procedure confirms the first procedure.

According to a further preferred development, if the results of the two procedures do not correspond, the wheel unit is assigned to the side of the vehicle on the basis of the second procedure. In this case, in which the results of the two procedures do not correspond, it can advantageously be deduced that actually the second problem scenario is present, in which the orientations of both wheel units located on the same axle do not correspond to the intended normal scenario.

Provision is preferably made for initially checking whether the assignment of the wheel unit to the side of the vehicle has already been carried out previously. For a further assignment, it is then possible optionally to refer to the previous assignment.

The wheel unit is preferably allocated to the side of the vehicle on the basis of the first procedure if the assignment of the wheel unit to the side of the vehicle has already been performed and, in the context of this previous assignment, it was established that directions of rotation which were previously determined by means of the wheel unit and the other wheel unit are different and results of an assignment of the wheel unit to the side of the vehicle by means of the first procedure and the second procedure correspond. In this case, it can advantageously be assumed that the first and the second problem scenario are not present. In the case of a further assignment of wheel unit to side of the vehicle, it is not necessary to repeat the second procedure and instead it is possible to refer directly to the directions of rotation that were determined by means of the wheel unit and the other wheel unit by means of the first procedure. A rapid assignment is thus possible.

The wheel unit is advantageously allocated to the side of the vehicle on the basis of an inverted result of the first procedure if the assignment of the wheel unit to the side of the vehicle has already been performed and, in the context of this previous assignment, it was established that directions of rotation which were determined by means of the wheel unit and the other wheel unit are the same and results of the assignment of the wheel unit to the side of the vehicle by means of the first procedure and the second procedure do not correspond. In this case, it can advantageously be assumed that the first problem scenario is not present but the second problem scenario is present. In the case of a further assignment of wheel unit to side of the vehicle, it is not necessary to repeat the second procedure and instead it is possible to refer directly to the directions of rotation that were determined by means of the first procedure by inverting their result. In this case, it is assumed that the orientation of the wheel unit and the other wheel unit are exactly opposite to that which would normally be the case. A rapid assignment is thus likewise possible.

In the case of the second procedure, it is particularly advantageous that acceleration information relating to an acceleration of the assigned wheel and steering information relating to steering of the vehicle are captured, the information being ascertained by the wheel unit. The wheel unit is assigned to the side of the vehicle by means of the acceleration information and the steering information. This embodiment of the second procedure can be realized easily and allows particularly reliable assignment of the wheel unit to the side of the vehicle. This second procedure is carried out while the vehicle is following a curved direction of travel.

The present invention is advantageously utilized if the wheel has a tire and the wheel unit is integrated in the tire. In precisely this case, the use of two different procedures provides particularly good certainty that the wheel unit is correctly assigned.

Other features which are considered as characteristic for the invention are set forth in the appended claims.

Although the invention is illustrated and described herein as embodied in method and device for assigning an electronic wheel unit, which is assigned to a wheel, to a side of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a flow diagram of an exemplary embodiment of a method according to the invention for assigning the wheel units to the sides of the motor vehicle.

DETAILED DESCRIPTION OF THE INVENTION

Figure 1:
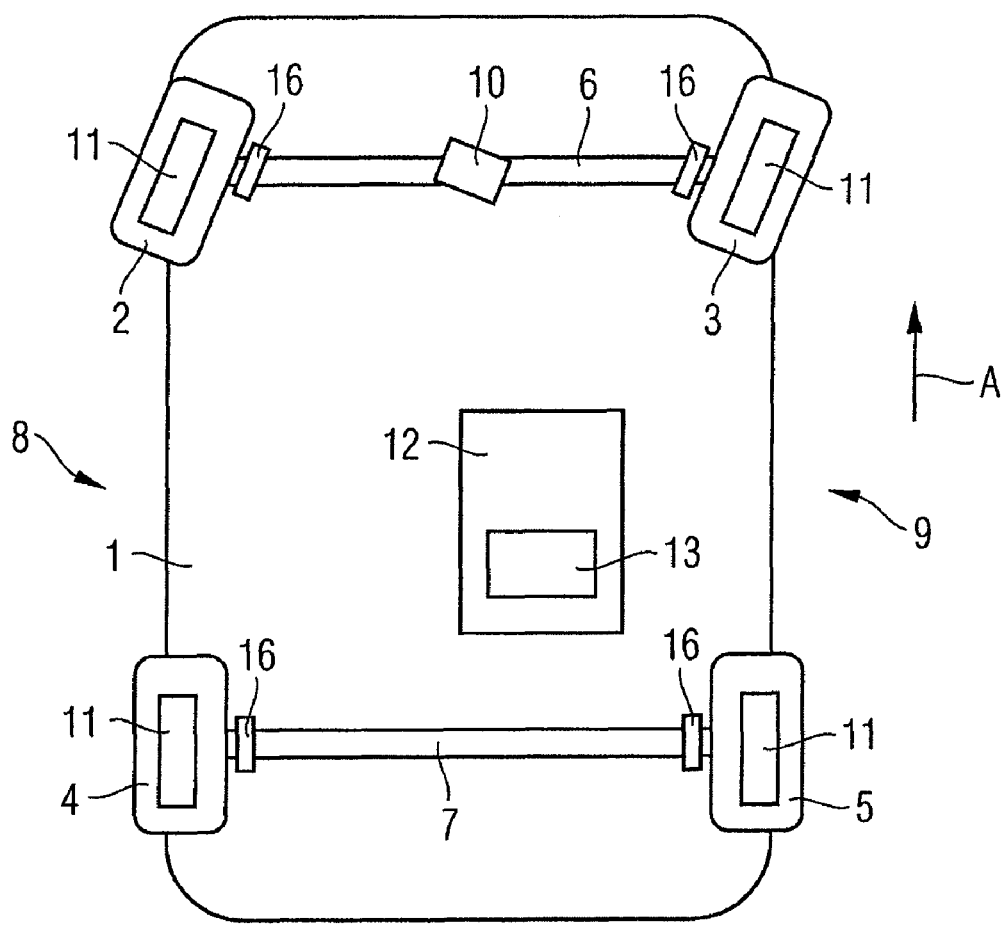
FIG. 1 shows a schematic illustration of a motor vehicle having four wheels, wherein electronic wheel units of a tire pressure monitoring system are integrated in the tires of the wheels.

Unless otherwise specified, identical elements or elements having identical functions in the figures of the drawing are designated using the same reference numerals.

Referring now to the figures of the drawing in detail and first, particularly, to FIG. 1 thereof, there is shown a schematic illustration of a motor vehicle 1 with four wheels 2, 3, 4 and 5. The wheels 2 and 3 are front wheels of the motor vehicle 1, and are attached at opposite ends of a front axle 6. The wheels 4 and 5 are rear wheels which are attached at opposite ends of a rear axle 7. The front axle 6 is configured such that steering can be effected in order to follow a curved direction of travel. In FIG. 1, the wheels 2, 3 exhibit an angularity relative to a forward direction of travel, this being indicated by an arrow A, of the motor vehicle 1, in order to illustrate the steering possibility. In order to detect the steering direction, i.e. whether steering is to the right or the left, a steering direction sensor 10 is arranged on the axle 6. However, the steering direction can also be ascertained in a different way. The two wheels 2 and 4 are arranged on a left longitudinal side 8 and the two wheels 3 and 5 on a right longitudinal side 9 of the motor vehicle 1. The wheels 2-5 are therefore assigned to fixed wheel positions on the motor vehicle 1. The wheel 2 is assigned to front left, FL, the wheel 3 to front right, FR, the wheel 4 to rear left, RL, and the wheel 5 to rear right, RR.

The wheels 2-5 have tires that are mounted on rims. Electronic wheel units 11 of a tire pressure monitoring system are integrated in the tires of the wheels 2-5. By virtue of the tire pressure monitoring system, it is possible automatically to monitor the pressures in the tires of the wheels 2-5. If a tire pressure which is ascertained by the tire pressure monitoring system in one of the wheels 2-5 does not correspond to a predetermined value, this is notified to a driver in a passenger compartment by means of a suitable display. The wheel units 11 feature pressure sensors for determining the tire pressures. The wheel units 11 can also feature further sensors which support the tire pressure monitoring system. Such sensors can be temperature sensors, for example. In the present exemplary embodiment, the wheel units 11 also feature rotational-direction sensors for ascertaining directions of rotation of the wheels 2-5 during the travel of the motor vehicle 1.

The motor vehicle 1 features a central control unit 12 for controlling the tire pressure monitoring system and for controlling further routines in the motor vehicle 1. The control unit 12 can communicate with the wheel units 11 of the wheels 2-5 via a wireless communication system. For this purpose, the control unit 12 and the wheel units 11 feature antennas for sending and receiving signals, the signals being in particular high-frequency signals. The control unit 12 contains a memory 13 (MEM) for storing information for the tire pressure monitoring system.

Figure 2:
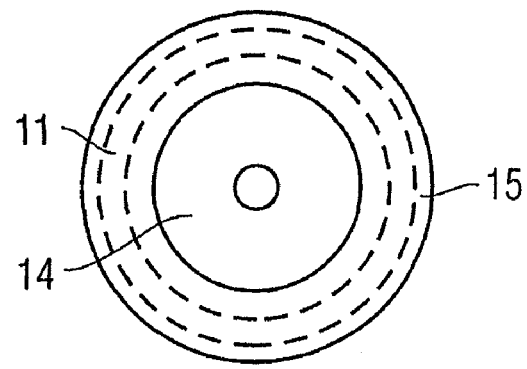
FIG. 2 shows a schematic side view of a wheel.

FIG. 2 shows a schematic side view of the wheel 2 by way of example for the wheels 2-5. The wheels 3-5 are constructed correspondingly. The wheel 2 features a rim 14, onto which a tire 15 is mounted. The wheel unit 11 which is integrated in the tire 15 is indicated by means of a broken line. The position and type of the arrangement of the wheel unit 11 shown in FIG. 2 is merely exemplary. Other possibilities also exist for integrating the wheel unit 11 in the tire 15.

For the purpose of monitoring the tire pressure in the wheels 2-5, the wheel units 11 of the wheels 2-5 transfer information which is ascertained by them, in particular the tire pressure of the respective wheel 2-5, to the central control unit 12 using signals via the communication system. It is now important for the central control unit 12 to be able to perform a precise assignment of the wheel units 11 to the wheel positions FL, FR, RL and RR. Only in this way is it possible reliably and unambiguously to show the driver of the vehicle 1 which wheel at which wheel position has a problematic tire pressure. Since the tires 15 are usually constructed in a symmetrical manner and do not have a preferred direction of rotation, it is not necessarily possible to ensure, when the wheels 2-5 are assembled, that their tires 15 including the integrated wheel units 11 are mounted in the same orientation on the rims 14. It is therefore conceivable that the tires 15, and therefore their wheel units 11, are arranged in different orientations on the rims 14 of the wheels 2-5. For reasons of safety, it is therefore beneficial for the exact assignment of the wheel units 11 to the wheel positions FL, FR, RL and RR to be performed automatically and independently by the motor vehicle 1. This can advantageously take place at least once during a journey of the motor vehicle 1, in particular shortly after the start of the journey.

The central control unit 12 is arranged asymmetrically in the motor vehicle 1, such that it has different distances relative to the axles 6 and 7. The distances between the central control unit 12 and the wheel units 11 of the wheels 2-5 are likewise advantageously different. In the present exemplary embodiment according to FIG. 1, the front axle 6 is further from the control unit 12 than the rear axle 7. As a result, an assignment of the wheel units 11 to the axles 6 and 7 can be performed easily. For this, the control unit 12 analyzes the signal intensities of the signals which are transferred by the wheel units 11. Signals having higher intensities are assigned to the wheel units 11 of the rear wheels 4, 5 of the rear axle 7 on the basis of the shorter distance of the rear axle 7 from the control unit 12. Signals having lower signal intensities are assigned to the wheel units 11 of the wheels 2, 3 of the front axle 6 on the basis of the greater distance of the front axle 6 from the control unit 12. In this way, an axle assignment of the wheel units 11 can be implemented as a component for assigning the wheel positions FL, FR, RL and RR to the wheel units 11.

As a further component for assigning the wheel positions FL, FR, RL and RR to the wheel units 11, following the assignment of the wheel units 11 to the axles 6, 7, an assignment of the wheel units 11 to one of the longitudinal sides 8 or 9 of the motor vehicle 1 is carried out. The combination of axle assignment and longitudinal side assignment then produces the wheel positions FL, FR, RL and RR of the wheel units 11. In order to assign the wheel units 11 to the longitudinal sides 8, 9, use is made of directions of rotation of the wheels 2-5, these being ascertained by means of the rotational-direction sensors. In a normal scenario, in which the tires 14 and hence the wheel units 11 all have the same orientations on the wheels 2-5, the wheel units 11 which are integrated in the tires 14 of wheels, the wheels being attached to the same axle and therefore arranged on different longitudinal sides of the motor vehicle, rotate in opposite directions. During forward travel of the motor vehicle 1, the wheel unit 11 on the left-hand side 8 of the motor vehicle 1 detects a forward rotation and the wheel unit 11 on the right-hand side 9 of the motor vehicle 1 detects a backward rotation. This is exactly the opposite during backward travel. As a result of the detection of the actual direction of travel, i.e. forwards or backwards, it is then possible to determine the sides 8, 9 on which the wheel units 11 are arranged. This procedure for assigning the wheel units 11 to the longitudinal sides 8, 9 of the motor vehicle 1 is also designated here as the first procedure for assigning the wheel units 11 to the longitudinal sides 8, 9.

As described above, however, this normal scenario is not necessarily present. Erroneous assignments of the wheel units 11 to the longitudinal sides 8, 9 can occur. These erroneous assignments can be avoided according to the invention. In particular, two different problem scenarios are established, in which the tires 14 and hence the wheel units 11 are mounted in incorrect orientation on the rims 14 of the wheels 2, 3 or 4, 5 which are located on the same axle 6 or 7 respectively. In the case of a first problem scenario, the directions of rotation determined by the wheel units 11 are the same. This first problem scenario can easily be detected by the motor vehicle 1, in particular by its central control unit 12, since the two directions of rotation of the wheel units 11 are not opposite to each other. Under normal correct circumstances, however, this should be the case. It is therefore not possible reliably to assign the wheel units 11 to one of the sides 8, 9 of the motor vehicle 1 exclusively by means of the determined directions of rotation. In the case of a second problem scenario, the directions of rotation determined by the wheel units 11 are different. Although this is also the case in the correct normal scenario, the orientations of both wheel units 11 might be exactly opposite to the orientations that would be present in the normal scenario. The orientations of both wheel units 11 are therefore exactly the reverse of the correct normal scenario. It is therefore likewise not possible reliably to assign the wheel units 11 to one of the sides 8, 9 of the motor vehicle 1 exclusively by means of the determined directions of rotation. This second problem scenario cannot be detected by the motor vehicle 1, in particular by its central control unit 12, exclusively on the basis of the determined directions of rotation and the first procedure.

According to the invention, it is possible to carry out a second procedure for assigning the wheel units 11 to the sides 8, 9 of the motor vehicle 1, in particular if one of the two problem scenarios is present. In the present exemplary embodiment, this second procedure consists in determining the accelerations of the two wheels 2, 3 or 4, 5, these being arranged on the same axle 6 or 7 respectively, during a curved direction of travel of the motor vehicle 1, which can be detected e.g. by the control unit 12 by means of the steering direction sensor 10. This is performed here by means of acceleration sensors 16 which are assigned to the wheels 2-5 and can be positioned on the axles 6, 7. In the case of the curved direction of travel, the wheel on the outside of the curve experiences greater acceleration than the wheel on the inside of the curve. This is ascertained by the control unit 12 using an analysis of the values supplied by the acceleration sensors 16. In addition, the steering direction sensor 10 detects whether a right-hand curve or a left-hand curve is followed. The wheel positions of the wheel units 11 can then be determined on the basis of the accelerations and the steering information.

Alternatively or in addition to the assignment of the wheel units 11 to the sides 8, 9 by means of determining the information relating to the wheel accelerations and the steering information, different second procedures can be used. In one of these different second procedures, for example, trigger units which are assigned to the wheels 2-5 are arranged in the vicinity of the wheels 2-5, e.g. in wheel housings of the motor vehicle 1. These trigger units are connected to the central control unit 12. The wheel units 11 are triggered by the trigger units using a low-frequency signal, e.g. 125 kHz. The triggered wheel unit 11 replies to the trigger signal, such that the control unit 12 can accurately determine the wheel positions at which the wheel units 11 are arranged. In a further different second procedure, the signal intensities of signals transferred by the wheel units 11 are analyzed such that the wheel units 11 can be assigned to the wheel positions on the basis of the signal intensities. In this case, the distance from the control unit 12 to each of the wheel positions differs, and therefore different intensities of the transferred signals are produced. The control unit 12 can be adjusted such that it is particularly sensitive for this analysis of the signal intensities. In a further different second procedure, the wheel units 11 transfer a specific telegram signal for a specific predetermined time period, e.g. 10 ms. As a result of the rotation of the wheels 2-5 during the predetermined time period, characteristic signal sequences are produced which are captured and analyzed by the control unit 12. For the sake of simplicity, the different second procedures described here can be limited to the assignment of the wheel units 11 to the sides 8, 9 of the motor vehicle 1.

Using the second procedure, it is possible accurately to identify the side on which the wheel units 11 are arranged. However, carrying out the second procedure requires additional time. According to the invention, the second procedure is therefore only carried out if a definitive result cannot be expected from the first procedure. This applies particularly in the case of the two problem scenarios described above. The second procedure is independent of the directions of rotation of the wheels 2-5, the directions of rotation being ascertained by means of the rotational-direction sensors of the wheel units 11.

FIG. 3 shows a flow diagram of an exemplary embodiment of a method according to the invention for assigning the wheel units 11 to the sides 8, 9 of the motor vehicle 1. In the case of the method according to this exemplary embodiment, it is assumed that an assignment of the wheel units 11 to the axles 6, 7 already took place previously. Furthermore, each of the wheel units 11 is assigned a unique identification code which, when signals are transferred, is sent to the central control unit 12 with the data which is ascertained by the wheel units 11. The central control unit 12 can assign the received data to the various wheel units 11 using these unique identification codes.

The following description of the flow diagram according to FIG. 3 relates to the assignment of two wheel units 11 which are arranged at opposite ends of a shared axle 6 or 7. The method begins in a step 20. In a step 21, a check first establishes whether the wheel units 11 have been assigned, in particular correctly, to the sides 8, 9 previously, i.e. during this journey of the motor vehicle 1 in this case. In the present exemplary embodiment, this is not the case when the method is carried out for the first time during a journey of the motor vehicle 1. The method therefore branches to a step 22, in which a check establishes whether the wheel units 11 exhibit the same directions of rotation. If this is the case, there follows a step 23 in which it is detected that the first problem scenario is present, according to which scenario the orientations of the two wheel units 11 of the same axle 6, 7 are different. The presence of this scenario is stored in the memory 13 by the central control unit 12, such that it can be referred to subsequently, particularly if the assignment is carried out again. In order to assign the wheel units 11 definitively, the second procedure is performed and the wheel units 11 are assigned to the sides 8, 9 on the basis of the result of this second procedure. The wheel units 11 are then correctly assigned. The method is then terminated in step 24 or assignments of further wheels are performed.

If it is established in the step 22 that the two wheel units 11 exhibit different directions of rotation, the method branches to a step 25, in which the second procedure is performed and its results are compared with the results of the first procedure and the detection of the directions of rotation. In the step 25, a check therefore establishes whether the results of the first procedure can be confirmed by the results of the second procedure. If this is the case, the method branches to a step 26 in which it is detected that neither of the two problem scenarios is present. This is stored in the memory 13, in order that this information can be used subsequently if required. The wheel units 11 are assigned on the basis of the results of the second procedure. They are then correctly assigned. They can also be assigned on the basis of the results of the first procedure, since these match the results of the second procedure. Finally, the method branches to the step 24 in which it is terminated or further assignments take place. If it is found in the step 25 that the results of the first and the second procedure are different, the presence of the second problem scenario is established in a step 27 and this is stored in the memory 13. The wheel units 11 are therefore admittedly in the same orientation, but both are arranged in that orientation which does not correspond to the accepted normal orientation. The wheel units 11 are assigned on the basis of the results of the second procedure. They are then correctly assigned and the method again branches to the step 24.

For this journey of the motor vehicle 1, it was therefore clearly detected whether or not one of the two problem scenarios is present. This was stored in the memory 13, such that the central control unit 12 can refer to it. In particular, the control unit 12 can do this in the step 21 of the method according to the invention. If it is actually established in this step 21 that an assignment, in particular a correct assignment, of the wheel units 11 to the sides 8, 9 was already performed previously, the method branches to a step 28 in which a check establishes whether the first problem scenario was previously detected. If this is the case, the method branches again to the step 23. The wheel units 11 are assigned on the basis of a renewed execution of the second procedure. If it is detected in the step 28 that the first problem scenario was not detected previously, the method branches to a step 29 in which a check establishes whether the second problem scenario was detected previously. If this is not the case, the wheel units 11 are assigned in a step 30 on the basis of the results of the first procedure. Neither of the two problem scenarios was detected. The second procedure advantageously does not have to be carried out. The method then branches to the step 24. However, if it is detected in the step 29 that the second problem scenario is present, the results of the first procedure are inverted in a step 31 and the wheel units 11 are assigned on the basis of these inverted results of the first procedure. Again in this case, the second procedure does not have to be carried out. The method then branches to the step 24.

By virtue of the fact that the second procedure does not have to be carried out and the results of the first procedure can be used in the steps 30 and 31, the assignment of the wheel units 11 to the sides 8, 9 of the motor vehicle 1 can advantageously be performed very quickly. In addition to assigning the wheel units 11 to the axles 6, 7, the driver of the motor vehicle 1 can be told very quickly which wheel has a problem with its tire pressure.

In the exemplary embodiment of the claimed method according to FIG. 3, it is established once during a journey of the motor vehicle 1 whether one of the two problem scenarios is present. This can likewise be performed more or even less frequently.

By virtue of the present invention, it is also possible advantageously to ensure that, following a tire change, the driver is supplied with correct information relating to the assignment of the wheel units, which can be integrated in the tires in particular, to the sides of the motor vehicle. In the case of a first assignment, the assignment is initially carried out on the basis of the reliable second procedure and its results are stored. In the case of subsequent assignments, it is then possible to refer to the previous findings and, if applicable, the assignments can be carried out exclusively on the basis of the rapid first procedure. If it is known that the second problem scenario is present, this information can be used to correct the results of the first procedure and to use them in an inverted manner, for example.

The invention claimed is:

1. A method of associating an electronic wheel unit with a side of a motor vehicle, wherein the electronic wheel unit is assigned to a wheel of the motor vehicle and is configured to ascertain at least one characteristic parameter of the wheel, the method which comprises:

determining a direction of rotation of a wheel with an associated wheel unit;

comparing the direction of rotation of the wheel determined by the wheel unit with a direction of rotation of another wheel determined with a respectively associated wheel unit to form a comparison result, wherein the wheel and the other wheel are mounted on mutually different sides of the motor vehicle on a shared axle; and depending on the comparison result, associating the wheel unit on a basis of a first procedure for associating the wheel unit with the side of the vehicle or on a basis of a second procedure for associating the wheel unit with the side of the vehicle, wherein the first procedure for associating the wheel unit utilizes the direction of rotation determined by the wheel unit, and the second procedure is independent of the direction of rotation determined by the wheel unit.

2. The method according to claim 1, which comprises not carrying out the second procedure if the wheel unit is assigned to the side of the vehicle on the basis of the first procedure.

3. The method according to claim 1, which comprises, if the direction of rotation determined by way of the wheel unit corresponds to the direction of rotation determined by way of the other wheel unit, associating the wheel unit with the side of the vehicle on the basis of the second procedure.

4. The method according to claim 1, which comprises, if the direction of rotation determined by way of the wheel unit is different from the direction of rotation determined by way of the other wheel unit, carrying out the first procedure and the second procedure and checking whether the results of the first and second procedures correspond to one another.

5. The method according to claim 4, which comprises, if the results of the first and second procedures do not correspond, associating the wheel unit with the side of the vehicle on the basis of the second procedure.

6. The method according to claim 1, which comprises, prior to the determining step, initially establishing whether or not an assignment of the wheel unit to the side of the vehicle was carried out previously.

7. The method according to claim 6, which comprises allocating the wheel unit to the side of the vehicle on the basis of the first procedure if the assignment of the wheel unit to the side of the vehicle was carried out previously and the previous assignment established that the direction of rotation determined by way of the wheel unit and the direction of rotation determined by way of the other wheel unit are different, and the results of an assignment of the wheel unit to the side of the vehicle by way of the first procedure and the second procedure correspond to one another.

8. The method according to claim 7, which comprises allocating the wheel unit to the side of the vehicle on the basis of an inverted result of the first procedure if the assignment of the wheel unit to the side of the vehicle was carried out previously and the previous assignment established that the direction of rotation determined by way of the wheel unit and the direction of rotation determined by way of the other wheel unit are the same, and the results of an assignment of the wheel unit to the side of the vehicle by way of the first procedure and the second procedure do not correspond.

9. The method according to claim 6, which comprises allocating the wheel unit to the side of the vehicle on the basis of an inverted result of the first procedure if the assignment of the wheel unit to the side of the vehicle was carried out previously and the previous assignment established that the direction of rotation determined by way of the wheel unit and the direction of rotation determined by way of the other wheel unit are the same, and the results of an assignment of the wheel unit to the side of the vehicle by way of the first procedure and the second procedure do not correspond.

10. The method according to claim 1, wherein the second procedure comprises capturing acceleration information relating to an acceleration of the assigned wheel and capturing steering information relating to steering of the vehicle with the wheel unit, and associating the wheel unit with the side of the vehicle by way of the acceleration information and the steering information.

11. The method according to claim 1, which comprises carrying out the process with the wheel having a tire and the wheel unit integrated in the tire.

12. A device for associating an electronic wheel unit with a side of a motor vehicle, wherein the electronic wheel unit is assigned to a wheel of the motor vehicle and is configured to ascertain at least one characteristic parameter of the wheel, the device comprising:

a control unit configured to:
control a determination, by way of a wheel unit, of a direction of rotation of a wheel;
compare the direction of rotation of the wheel determined by way of the wheel unit with a direction of rotation of another wheel determined by way of another wheel unit assigned to the other wheel, wherein the wheel and the other wheel are mounted on mutually different sides of the vehicle on a shared axle; and
depending on the comparison of the direction of rotation of the wheel with the direction of rotation of the other wheel, assign the wheel unit on the basis of a first procedure for assigning the wheel unit to a side of the vehicle or on the basis of a second procedure for assigning the wheel unit to a side of the vehicle; and wherein said control unit utilizes the direction of rotation determined by the wheel unit in the first procedure, and said control unit performs the second procedure independent of the direction of rotation determined by way of the wheel unit.

* * * * *